(12) United States Patent
Cole et al.

(10) Patent No.: US 12,517,242 B2
(45) Date of Patent: Jan. 6, 2026

(54) AUTONOMOUS HORIZONTAL DIRECTIONAL DRILLING ("HDD") TRACKING SYSTEM WITH ROVER

(71) Applicant: The Charles Machine Works, Inc., Perry, OK (US)

(72) Inventors: Scott B. Cole, Edmond, OK (US); Klayton Day Jones, Perry, OK (US); Robert Stevens, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 307 days.

(21) Appl. No.: 18/191,307

(22) Filed: Mar. 28, 2023

(65) Prior Publication Data

US 2023/0314593 A1     Oct. 5, 2023

Related U.S. Application Data

(60) Provisional application No. 63/325,227, filed on Mar. 30, 2022.

(51) Int. Cl.
    *G01S 13/86*     (2006.01)
(52) U.S. Cl.
    CPC .................... *G01S 13/86* (2013.01)
(58) Field of Classification Search
    CPC ........... G01S 13/86; G01S 5/0205; G01S 5/00
    See application file for complete search history.

(56) References Cited

U.S. PATENT DOCUMENTS

| | | | |
|---|---|---|---|
| 4,812,812 A | 3/1989 | Flowerdew et al. | |
| 5,264,795 A | 11/1993 | Rider | |
| 5,720,354 A * | 2/1998 | Stump | E21B 47/0232 175/45 |
| 6,268,731 B1 | 7/2001 | Hopwood et al. | |
| 6,868,314 B1 | 3/2005 | Frink | |
| 7,111,693 B1 | 9/2006 | Self et al. | |
| 7,150,331 B2 * | 12/2006 | Cole | E21B 47/024 175/45 |
| 7,231,320 B2 | 6/2007 | Papadimitriou et al. | |
| 7,350,594 B2 | 4/2008 | Cole et al. | |
| 7,647,987 B2 | 1/2010 | Cole | |
| 7,663,373 B1 * | 2/2010 | Gard | G01V 3/081 702/158 |
| 7,683,821 B1 * | 3/2010 | Clodfelter | F41H 11/16 342/22 |
| 7,786,731 B2 | 8/2010 | Cole et al. | |
| 8,018,382 B2 | 9/2011 | Shore et al. | |
| 8,072,220 B2 | 12/2011 | Dolgin et al. | |
| 8,497,684 B2 | 7/2013 | Cole et al. | |

(Continued)

*Primary Examiner* — Bernarr E Gregory
(74) *Attorney, Agent, or Firm* — Tomlinson McKinstry, P.C.

(57) ABSTRACT

A system for tracking an underground object. An above-ground tracking device has an antenna array located at a terminal end. The antenna array can determine a location of the underground object based upon the direction and magnitude of a magnetic field emanating from that object. The tracking device is registrable with a rover such that the antenna array may be moved by the rover in response to the magnetic field. A processor onboard the tracking device may communicate commands to the rover to either maintain its position relative to the underground object, or move to a location where the magnetic field can be measured.

21 Claims, 7 Drawing Sheets

(56) References Cited

U.S. PATENT DOCUMENTS

| | | | |
|---|---|---|---|
| 9,329,297 B2 | 5/2016 | Cole et al. | |
| 9,527,588 B1 | 12/2016 | Rollefstad | |
| 9,547,101 B2 | 1/2017 | Cole et al. | |
| 10,105,723 B1* | 10/2018 | Olsson | B05B 12/122 |
| 11,786,283 B1* | 10/2023 | DeWolf | A61B 34/10 |
| | | | 606/96 |
| 2002/0020559 A1 | 2/2002 | Barbera et al. | |
| 2002/0116129 A1 | 8/2002 | Alft et al. | |
| 2006/0254820 A1* | 11/2006 | Cole | G01V 3/081 |
| | | | 175/45 |
| 2009/0038850 A1* | 2/2009 | Brune | G01V 3/15 |
| | | | 175/45 |
| 2009/0070063 A1* | 3/2009 | Edelstein | G01V 3/081 |
| | | | 702/150 |
| 2010/0001731 A1 | 1/2010 | Royle et al. | |
| 2010/0141261 A1* | 6/2010 | Overby | G01V 3/12 |
| | | | 702/2 |
| 2012/0146648 A1 | 6/2012 | Eick et al. | |
| 2012/0212221 A1* | 8/2012 | Cole | G01V 3/28 |
| | | | 324/258 |
| 2014/0111211 A1 | 4/2014 | Cole et al. | |
| 2014/0163775 A1 | 6/2014 | Metzler | |
| 2014/0303814 A1 | 10/2014 | Burema et al. | |
| 2016/0018551 A1 | 1/2016 | Cole et al. | |
| 2016/0117932 A1 | 4/2016 | Park et al. | |
| 2016/0356146 A1 | 12/2016 | Gard et al. | |
| 2022/0026238 A1* | 1/2022 | Olsson | G01V 3/081 |

* cited by examiner

AUTONOMOUS HORIZONTAL DIRECTIONAL DRILLING ("HDD") TRACKING SYSTEM WITH ROVER

SUMMARY

The present invention is directed to an apparatus. The apparatus comprises a tracking assembly and a rover. The tracking assembly has a body defining an external profile and comprises an antenna array disposed within the body and a processor. The rover comprises a plurality of ground engaging motive members and a frame supported by the plurality of motive members. The frame comprises a cradle having a surface complementary to the external profile of the tracking assembly such that the tracking assembly is registrable within the cradle. The processor is configured to receive an antenna signal from the antenna array and, in response, transmit a rover signal to the rover.

In another aspect the present invention is directed to a method. The method comprises emitting a dipole magnetic field from a below-ground source, placing an above-ground receiver into a cradle on a rover, detecting the magnetic field with the above ground receiver at a first above-ground location, and moving the rover to a second above ground location.

In another aspect, the invention is directed to a method. The method comprises, in a first mode corresponding to hand-held operation, detecting a magnetic field with a tracking device comprising an antenna array. The method further comprises placing the device on a wheeled rover and electronically paring the device to the wheeled rover, thereby placing the tracking device into a second mode. Thereafter, the magnetic field is detected with the tracking device in the second mode. The location of the source of a magnetic field is determined with the device in a selected one of the first mode and the second mode.

DETAILED DESCRIPTION

Figure 1:
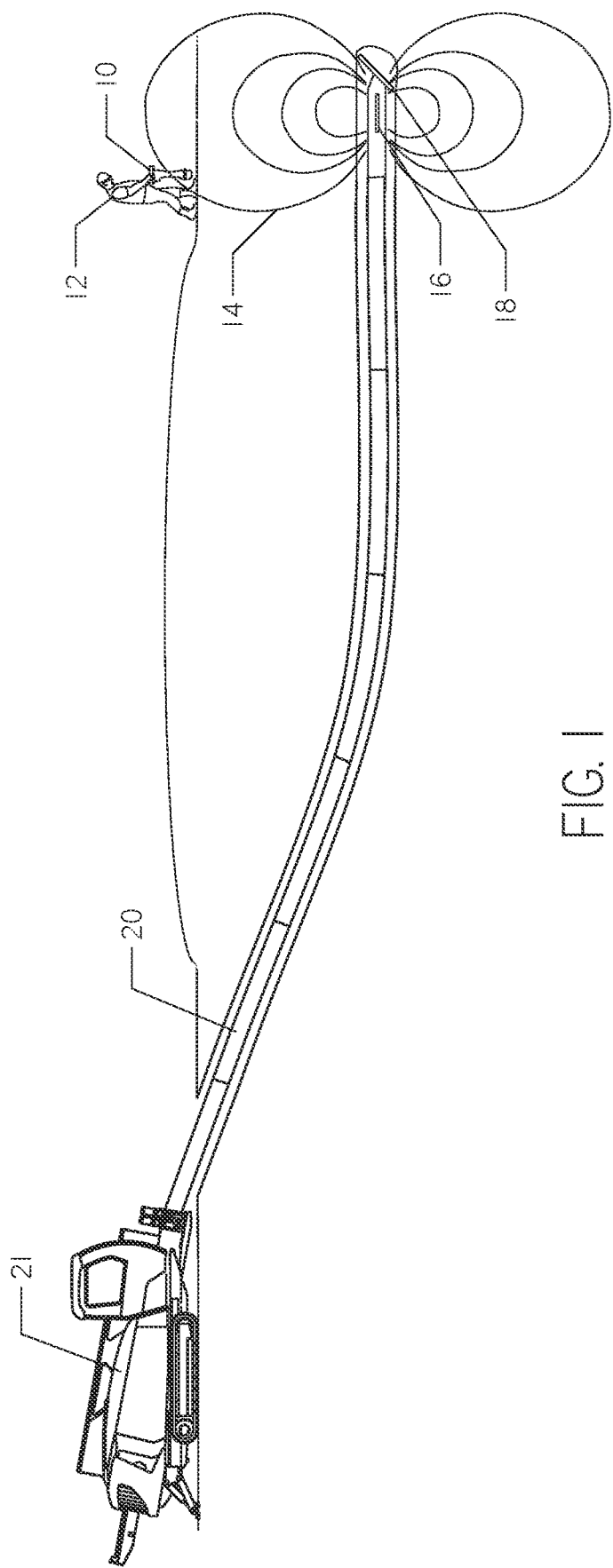
FIG. 1 is a diagrammatic representation of a drilling site with a tracker operator following a drill bit. None of the bit, drill string, tracker, or operator are shown to scale.

Tracking operations, such as that shown in FIG. 1, typically involve a tracker 10, held by an operator 12, which is used to detect an electromagnetic field 14 emitted from an underground beacon 16. The beacon 16 is located near a bit 18 at the end of a drill string 20. The drill string 20 is advanced (or, in backreaming operations, pulled back) by a drilling machine 21. By tracking the position of the beacon 16, the path of the drill string 20 is confirmed and the depth measured, enabling subsequently installed utilities to be placed at a known position. The use of such beacons 16 and trackers 10 is known in the art, and can be found described in U.S. Pat. No. 11,204,437, issued to Cole, et al., and U.S. Pat. No. 7,786,731, issued to Cole, et al., the contents of each being incorporated herein by reference.

Figure 2:
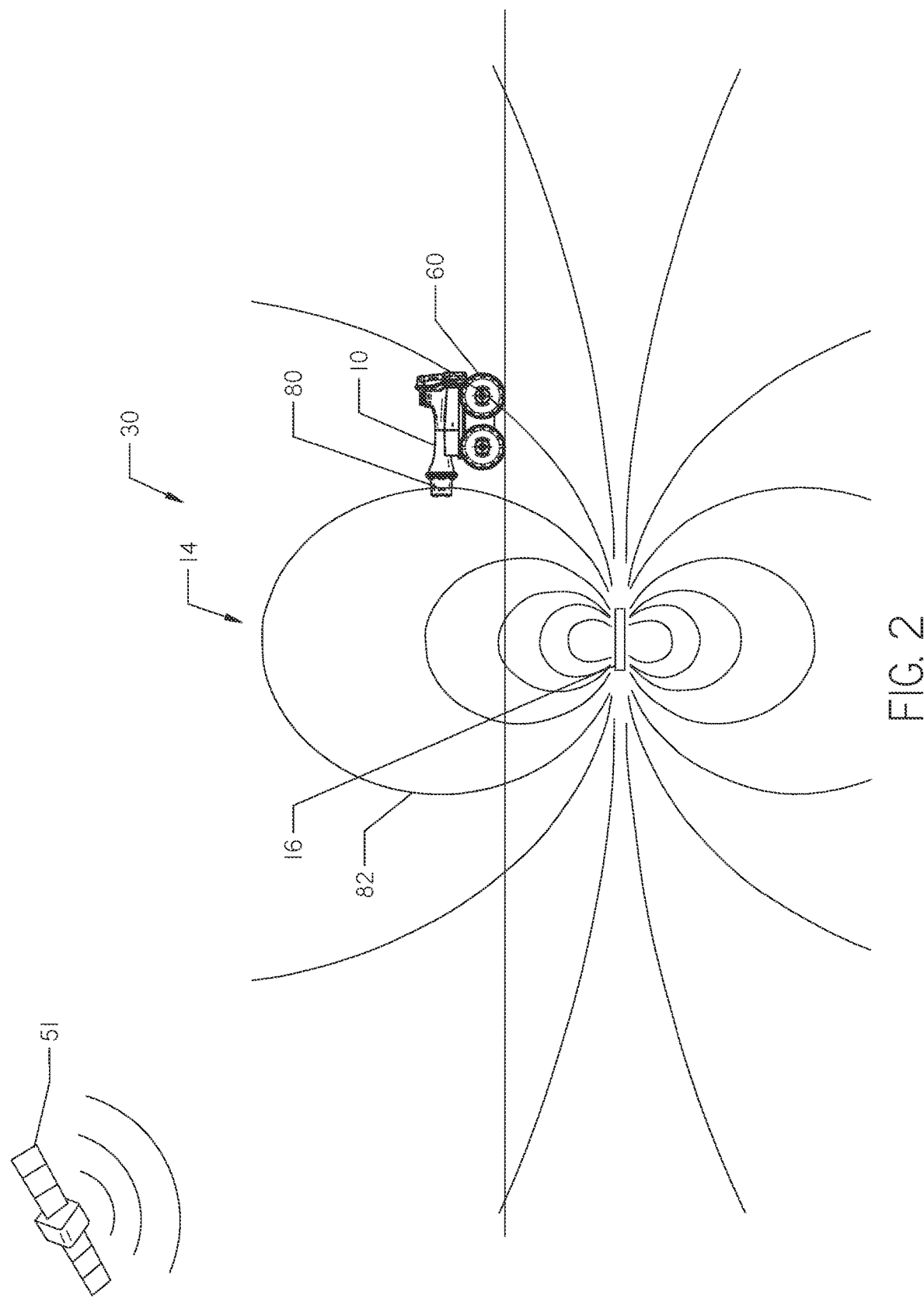
FIG. 2 is a diagrammatic representation of an underground magnetic field source, with a tracker-rover system shown in a null field position relative to the beacon. The drill string and other underground components are not shown. A Global Positioning System ("GPS") satellite is also shown.
Figure 3:
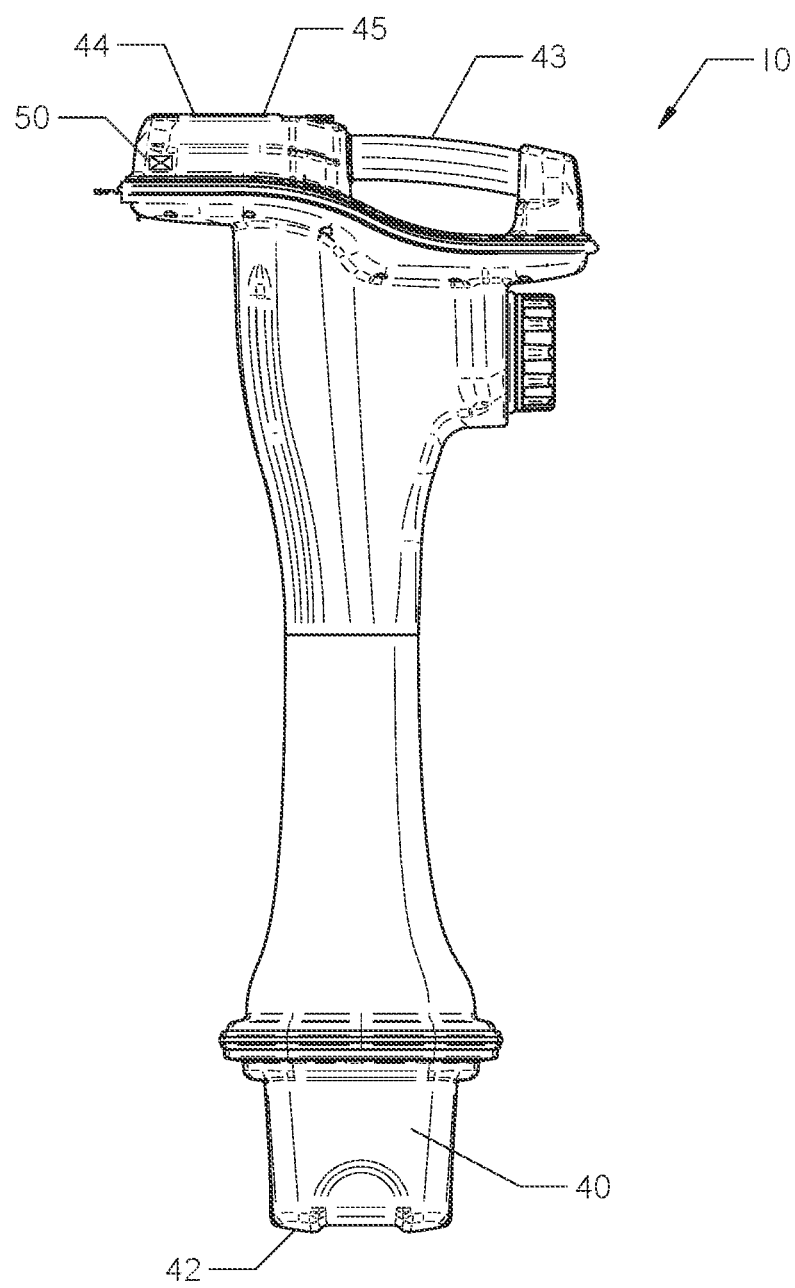
FIG. 3 is a side view of a tracker apparatus. The tracker apparatus is shown with a first and second end, as may be used with the tracker-rover system of the present invention.

The present invention, shown in FIGS. 2-7, provides a HDD tracker system 30 that can autonomously track the beacon 16. The system 30 is compatible for multiple tracker 10 devices. The tracker 10 shown in FIG. 3 is one such tracker device. An antenna array 40 is disposed at the first end 42 of the tracker 10. A handle 43 and display 44 are disposed at a second end 45. The first end 42 is, in standard operations such as in FIG. 1, at a lowest point during operations, such that a standing operator 12, holding a handle 43 at the second end 45, may place the array 40 near a surface of the ground.

Figure 4:
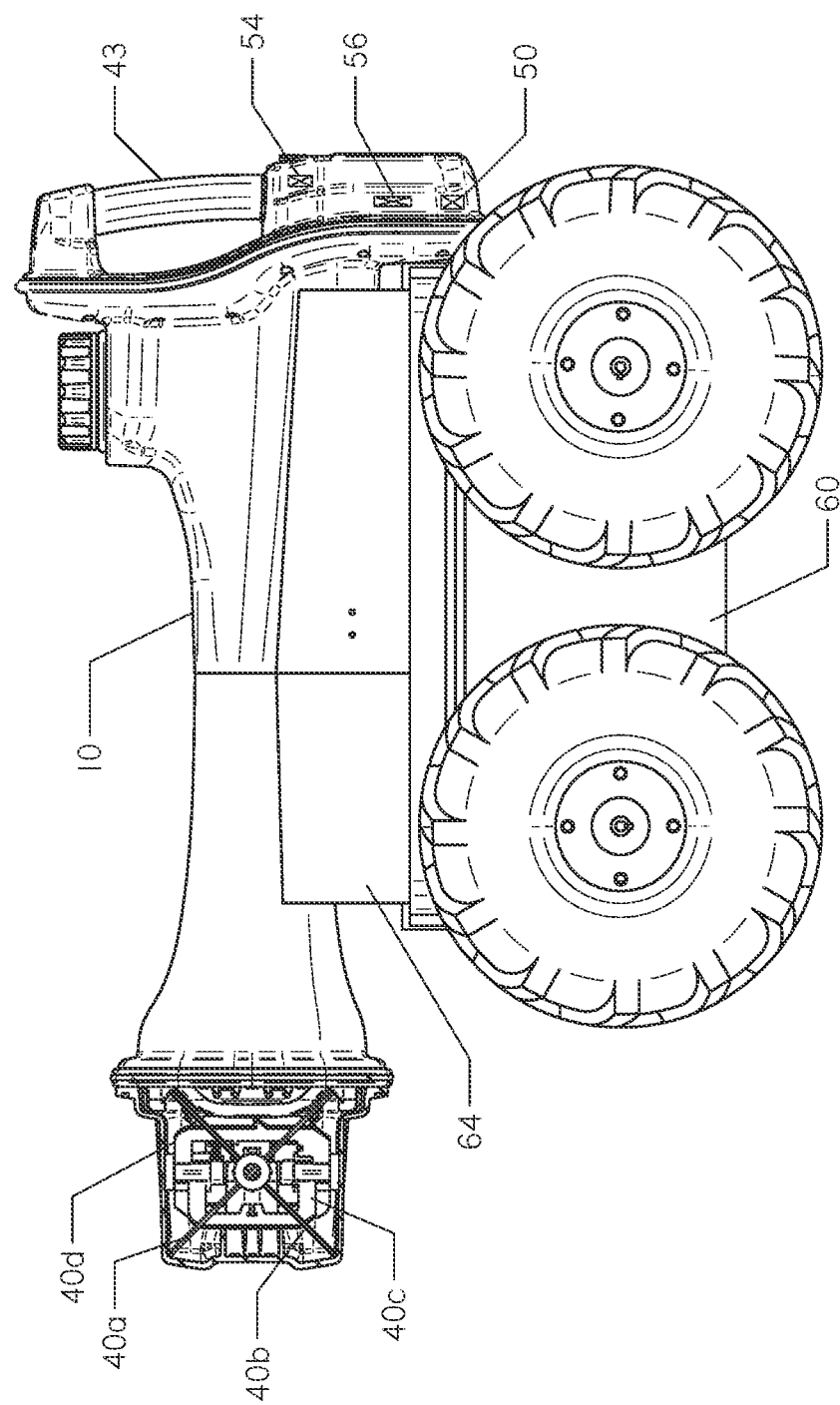
FIG. 4 is a side view of the tracker-rover system. A cover is partially removed from the antenna assembly of the tracker such that antenna loops can be seen. As shown, there are four antenna loops within the antenna portion of the tracker. The tracker is paired to the rover.

The antenna array 40 may comprise four individual antenna loops 40a, 40b, 40c, 40d, forming the four-axis antenna array shown FIG. 4. Three-axis arrays may also be utilized. The methods for locating a beacon 16 using the magnetic field 14 for each version of the array 40 is found in the incorporated references.

The tracker 10 may also include a GPS sensor 50 to locate the absolute position of the tracker during its operations. Such a GPS sensor 50 communicates with one or more global positioning satellites 51. As a result, the tracker 10 may determine an absolute underground position of the beacon 16, using the absolute position of the tracker 10 and the position of the beacon 16 relative to the tracker 10 as determined by the magnetic field 14 detected by the antenna array 40.

The system 30 further comprises a rover 60. The rover 60 may be battery powered to enhance its mobility and autonomy. The battery may be interchangeable and rechargeable. The rover 60 and tracker 10 may wirelessly pair and the tracker 10 may maintain communication with the horizontal directional drilling machine 21. Preferably, the rover 60 is movable primarily through signals received from the tracker 10, and responsive to directions, whether manual or automated, such that it can move.

As shown, the rover 60 comprises four wheels 62, though a tracked configuration may be advantageous in certain ground conditions. The wheels 62 may be powered by individual electric motors.

The tracker 10 comprises an elongate body 26 having an outer profile. In ordinary operations, the tracker 10 is held by the handle 43 in a vertical orientation, with the first end 42 near the ground surface. This may be referred to as the hand-held mode. However, this vertical positioning of the tracker 10 is not preferable on a rover 60 due to the antenna array 40 placement above the rover and high center of gravity of the system.

Figure 6:
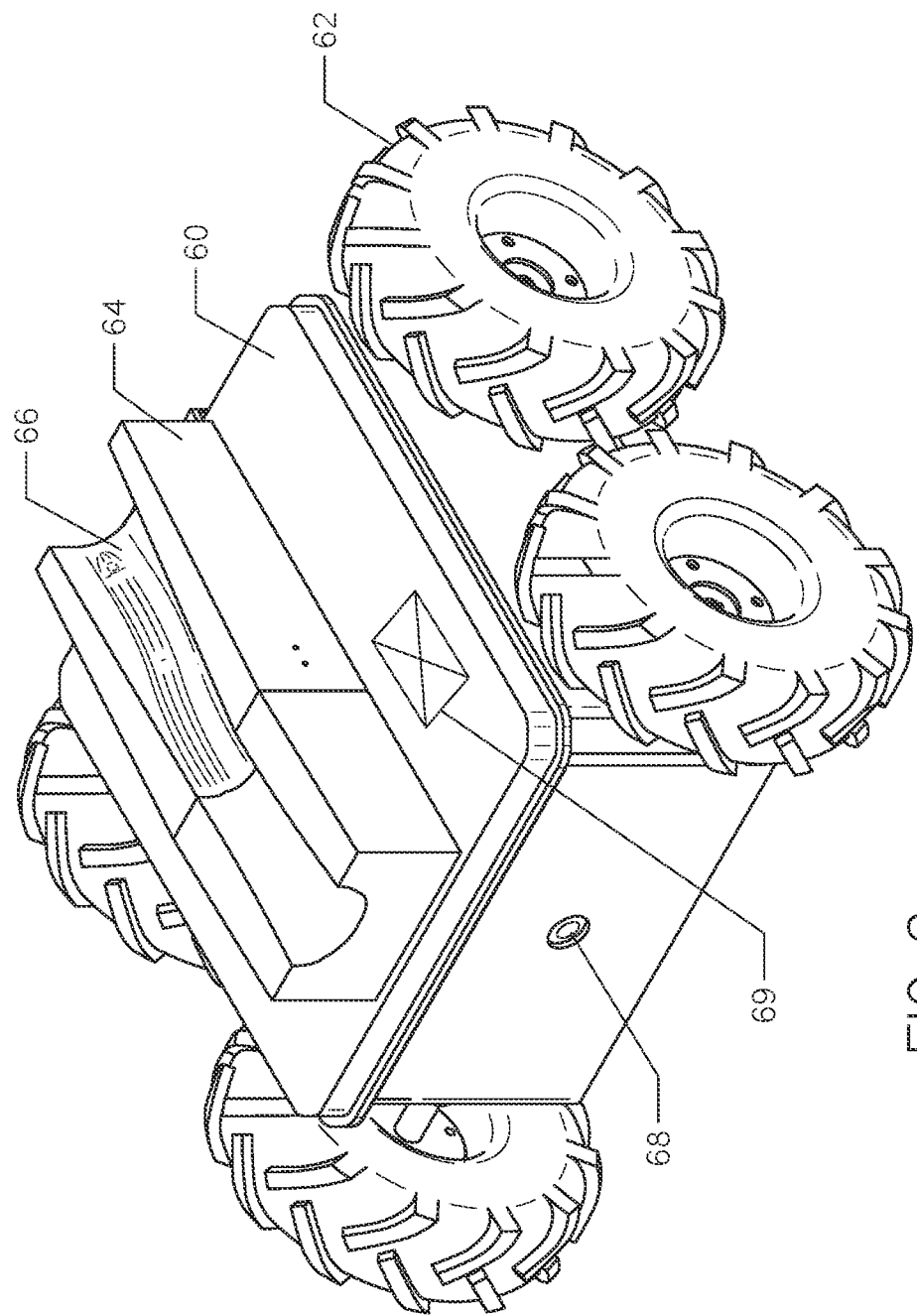
FIG. 6 is a front top right perspective view of the rover, without the tracker within the cradle. The concave portion of the cradle which conforms to an external profile of the tracker body is shown.
Figure 7:
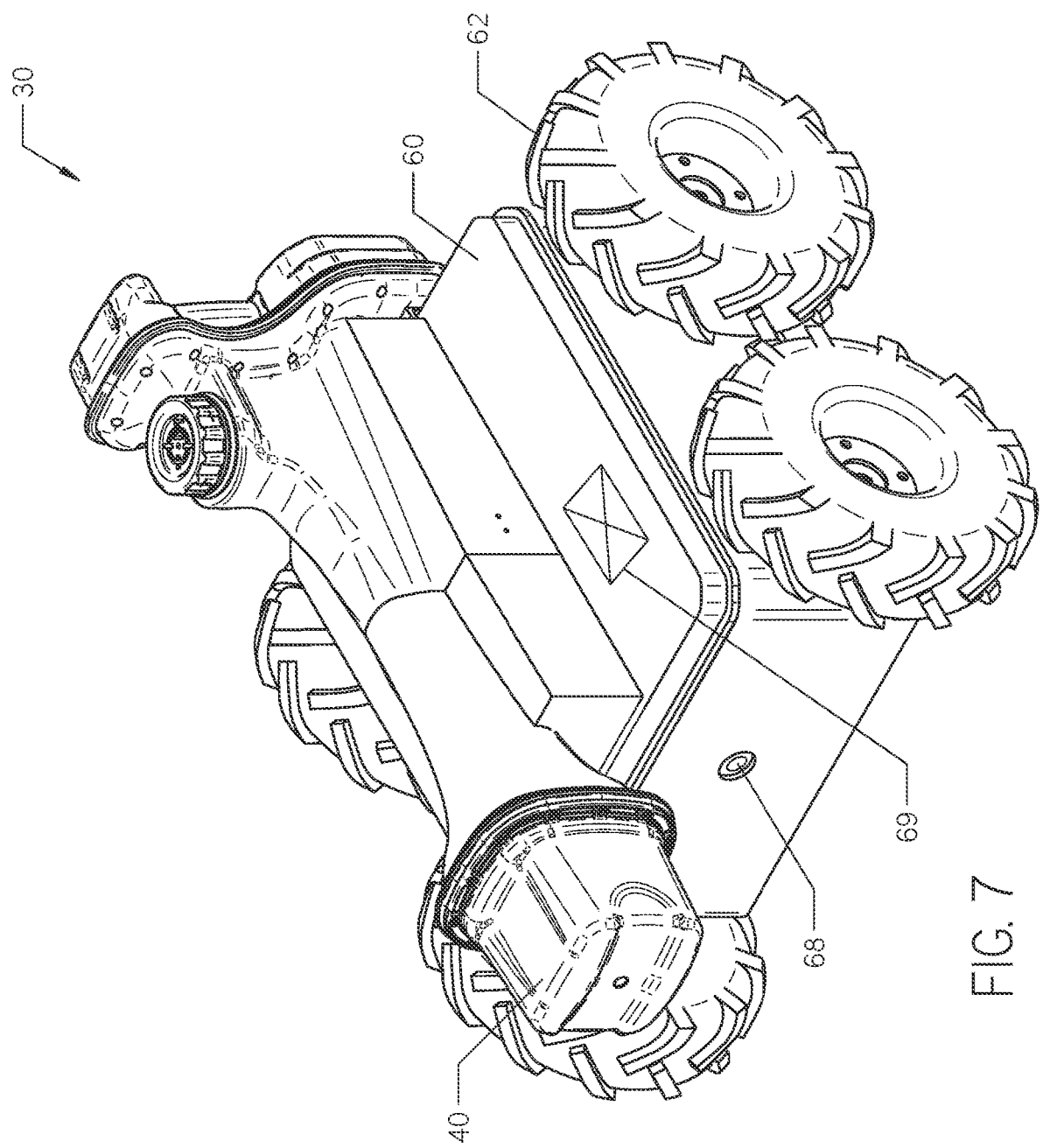
FIG. 7 is the view of FIG. 6, with the tracker disposed within the cradle.

The rover 60 comprises a cradle 64. As best shown in FIG. 6, the cradle 64 has a concave section 66. The concave section 66 is complementary to the external profile of the elongate body 26 of the tracker 10. When placed on the rover 60, the tracker 10 is set in the cradle 64 in a horizontal position. This is referred to as the rover mode. It may be preferable for the cradle 64 to be removable, such that alternate cradles with concave sections 66 complementary to the external profiles of additional alternative trackers may be utilized without replacing the rover 60. Preferably, for any tracker 10, there is only one orientation in which the elongate body 26 fits within the concave section 66. This ensures that the orientation of the antenna assembly 40 relative to the rover 60 (and thus, the ground) is known.

Rover mode on the rover 60 may be activated by connection with the tracker 10. Connection may take place via BLUETOOTH® or other wireless method. Alternatively, an electrical connection may be made between a contact on the tracker 10 and the cradle 64. Additionally, a switch may be provided in the cradle 64 that is activated by the tracker 10 when placed in the cradle. The switch may trigger pairing between the tracker 10 and rover 60.

The rover 60 may rely on the tracker's onboard sensors for navigation, such as the GPS receiver 50. In operation, the tracker 10 may provide driving instructions to the rover 60 through the wireless connection.

Once in rover mode, a processor 54 identifies a reorientation of the antenna array 40 and is configured to determine the relative location of the beacon 16 based on the new orientation.

The tracker 10 may have one or more onboard inclinometers 56 which may determine the orientation of the antenna assembly 40. A rotation matrix may thus be used for reorienting the antennas correctly.

When placed on the rover 60, the distance between the ground level and the antenna assembly 40 is known based upon the geometry of the tracker 10 and the rover 60. This height can be accounted for when determining the location of the beacon 16 underground.

In operation, there are multiple methods that the processor 54 may use to control movements of the rover 60 to track the beacon 16.

First, the rover 60 may be controlled manually with a remote, held by an operator 12. The operator 12 may be co-located with the drilling machine 21 or at a remote location. Manual control may be preferable for the initial positioning of the rover 60 above a path of the drill string 20, or when obstacles exist on the ground that the rover 60 should be manually maneuvered around.

Second, the rover 60 and tracker 10 may be operated in "drill-to" mode. In this mode, a bore path plan is created, which includes a desired path. This path may have waypoints. In this mode, the rover 60 proceeds to the preselected waypoint using the GPS sensor 50 on the tracker 10. When the electromagnetic field 14 detected at the antenna array 40 indicates that the beacon 16 is at such a waypoint, the rover 60 will automatically proceed to the next waypoint. This process may proceed until the bore is completed.

Additionally, the rover 60 may follow a point in the electromagnetic field 14. For example, as shown in FIG. 2, the rover 60 may maintain the antenna assembly 40 such that it is at a null point, such as the "front" null 80. A null point is a point in the magnetic field at which the field has only a vertical component on a cartesian coordinate system. As the beacon 16 is advanced by the drill string 20, the front null point 80 likewise advances. The tracker 10 would detect that it is "behind" the front null point 80, and move to maintain its position within the field 14. The front null point 80, and the corresponding rear null point 82, are advantageous for determining the relative position of the beacon 16.

The geometry of the magnetic field 14 at each null point 80, 82 is substantially vertical. Likewise, the shape of the magnetic field 14 at any point may be used to guide the tracker 10 to a null point 80, 82. Accordingly, the processor 54 must know which mode the tracker 10 is in, such that the field 14 measured at the antenna array 40 is properly understood. For example, when in hand-held mode, the field at a null point 80, 82 measured by the loops 40*a*-*d* of the antenna array 40 will be substantially parallel to a longitudinal axis of the elongate body 26 of the tracker 10. However, this same reading would have a different meaning when the tracker 10 is placed within the cradle 64 and substantially horizontal—namely, that the tracker 10 is directly above the beacon 16, rather than at a null. In "rover" mode, the field will be substantially perpendicular to the axis of the body 26 of the tracker 10.

The processor 54 therefore accounts for the mode of the tracker 10 when the direction and the magnitude of the detected field 14 is signaled to the processor. Because the cradle 64 places the antenna array 40 at a known position relative to the ground surface, the processor 54 also accounts for the increase in distance between the ground and the antenna array 40 when in rover mode.

While the Figures show the tracker in a substantially horizontal orientation when in the cradle 64 of the rover 60, other orientations are possible. For example, the cradle 64 may require the tracker 10 to be at an angle to horizontal, or may require it to be vertical. Whatever the orientation of the tracker 10 when registered within the cradle 64, it is known to the processor 54 such that the processor 54 can determine the absolute orientation of flux lines within the electromagnetic field 14. When in "rover" mode, the processor 54 takes into account the known orientation of the tracker 10 when determining a location of the beacon 16.

In this method, it is possible for multiple systems 30 to be utilized. For example, two could be used, with one rover 60 maintaining its antenna array 40 at the front null point 80, and a second rover 60 maintaining its antenna array at the rear null point 82. Multiple systems 30 may be used to triangulate the location, depth, offset, and other conditions of the beacon 16. Alternatively, a first tracker 10 may be used with a rover 60 and a second tracker may be used in standard operation by a human operator.

Figure 5:
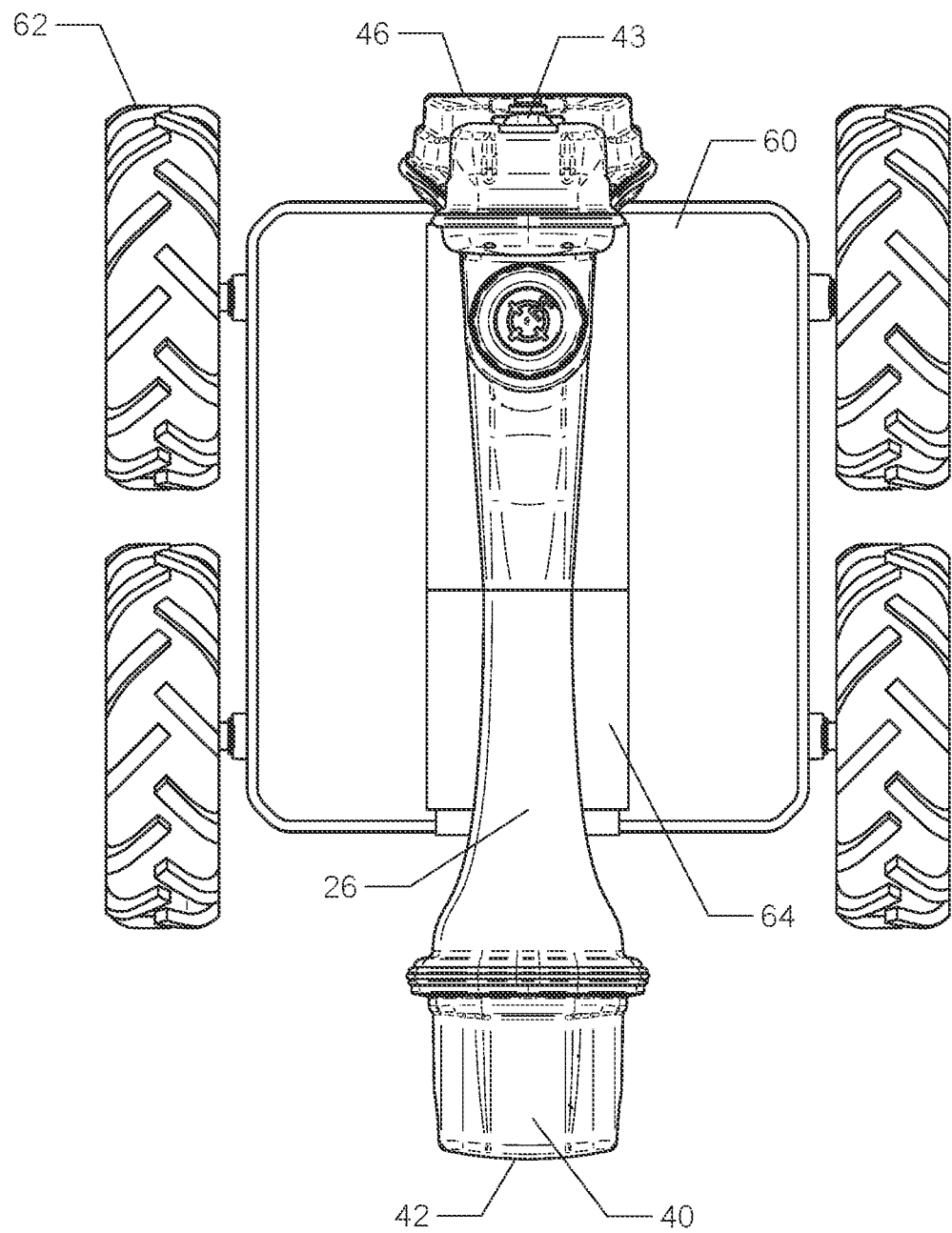
FIG. 5 is a top view of the tracker-rover system. The antenna assembly is suspended outside of the footprint of the rover.

Internal components and the physical body of the rover 60 can distort the electromagnetic field 14. To solve this problem the cradle 64 is designed to allow the antenna array 40 to extend outside the footprint of the rover 60, as best shown in FIG. 5.

Further, the rover 60 may position itself so that the rover 60 is not between the field 14 and the antenna array 40. For example, if the rover 60 is following the front null point 82, the rover 60 will position itself forward of the antenna array 40 relative to the beacon 16. This configuration allows the greatest "field of vision" for detection of the electromagnetic field 14 by the antenna array 40. Furthermore, the rover 60 may power down while the tracker 10 is recording the field 14 to further decrease signal interference.

In addition, the system may have a "Get out of the way mode". When the beacon 16 is too close to the antenna array 40, it may cause the electromagnetic field 14 signal to become saturated. The rover 60 may automatically move away to get back into the appropriate range for detecting the field 14. This condition may exist near an exit pit for the drill string 20, and, as such, getting away from the beacon 16 may prevent damage due to falling into an exit pit or impact from the drill bit.

The system 30 can be controlled from a remote location, such as from the drilling machine 21 display, a remote, a smartphone, AR/VR glasses, etc. The drilling machine 21 may, in any instance, continue to communicate directly with the tracker 10 to receive information about the beacon 16. The rover 60 could receive communications from the drilling machine 21 through the tracker 10, or directly from the drilling machine 21 or other remote location.

In addition to sensors on the tracker 10, the rover 60 may comprise one or more cameras 68 or other sensors, such as lidar, to allow the drill operator to remotely view obstacles in front of the rover 60 and manually drive around obstacles if necessary. The camera 68 or lidar may also be used for automatic obstacle avoidance. The rover 60 may further comprise an onboard one or more sensors 69, such as inclinometers, GPS, compass or other sensors for navigation, mapping terrain, etc. Onboard sensors 69 may allow the rover 60 to properly align the antenna array 40 in relation to the beacon 16 to minimize interference. The rover 60 may also comprise safety sensors, such as to detect gas or high voltage, to provide a warning in case the drill string 20 has struck an existing utility.

When used herein, the word "substantially" when used to refer to a geometric arrangement means only that the item must not be strictly in that arrangement with no tolerance. For example, "substantially vertical" orientation of the tracker 10 is associated with an operator holding the handle 43 and suspending the elongate body 26 according to gravitational force. "Substantially vertical" orientation includes all such ordinary uses in handheld mode, and does not require a strict tolerance. Likewise, "substantially horizontal" orientation may not be strictly horizontal because of the slope of the ground, and the use of the tracker 10 within the rover mode shall be "substantially horizontal" even when the ordinary gradient of the ground surface causes some deviation from strict horizontal arrangement. An artisan will understand that no use of a tracker 10 device includes perfect conditions. However, the use of an orientation sensor in the tracker 10 or rover 60 will enable the processor 54 to account for deviations from vertical or horizontal.

Likewise, the antenna array 40 orientation in "rover mode" may be, as shown in the Figures, "substantially perpendicular" to its orientation in the "handheld mode". In this context, "substantially" accounts for these deviations from vertical and horizontal which are understood in practical application, and does not require a precise right angle to fit within the meaning of the specification and claims.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. An apparatus comprising:
    a tracking assembly having a body defining an external profile, the tracking assembly comprising:
        an antenna array disposed within the body; and
        a processor; and
    a rover comprising:
        a plurality of ground engaging motive members; and
        a frame supported by the plurality of motive members, the frame comprising a cradle having a surface complementary to the external profile of the tracking assembly;
    wherein the processor is configured to:
        receive an antenna signal from the antenna array and, in response, transmit a rover signal to the rover.

2. The apparatus of claim 1 in which the rover is configured to move the plurality of ground engaging motive members in response to the rover signal.

3. The apparatus of claim 1 in which:
    the body is elongate and disposed on the frame such that the external profile of the tracking assembly is located adjacent to the surface complementary to the external profile.

4. The apparatus of claim 3 in which the frame overlies an area of the ground defining a footprint, wherein the antenna assembly overlies an area of the ground outside of the footprint.

5. The apparatus of claim 1 in which the external profile of the tracking assembly is complementary to the surface of the cradle in one and only one orientation.

6. The apparatus of claim 1 in which:
    the body is characterized as an elongate body; and
    the processor is configured to operate in a first mode and a second mode, wherein:
    the first mode is defined by the elongate body being oriented substantially vertically; and
    the second mode is defined by the elongate body being oriented substantially horizontally.

7. The apparatus of claim 6 further comprising:
    an orientation sensor disposed on the tracker.

8. The apparatus of claim 6 wherein:
    the processor is configured to operate in the second mode when the external profile contacts the cradle.

9. A system, comprising:
    an underground transmitter configured to emit a magnetic field; and
    the apparatus of claim 1, wherein the antenna array is within the magnetic field and comprises at least three antenna loops, wherein each antenna loop is configured to detect a component of the magnetic field.

10. The system of claim 9 in which the processor is configured to direct the rover to a point at which the antenna array detects a null field in two of the three antenna loops.

11. The apparatus of claim 1 in which the tracking assembly further comprises a handle and a display.

12. A method, comprising:
    emitting a dipole magnetic field from a below-ground source;
    placing an above-ground receiver into a cradle on a rover;
    detecting the magnetic field with the above-ground receiver at a first above-ground location, wherein the first above-ground location is located at a null point in the magnetic field;
    advancing the below-ground source; and
    moving the rover to a second above-ground location by maintaining the rover such that the above-ground receiver is at the null point in the magnetic field while the below-ground source is advanced.

13. The method of claim 12 further comprising:
    removing the above-ground receiver from the cradle;
    orienting the receiver substantially vertically; and
    detecting the magnetic field with the above-ground receiver in the substantially vertical orientation.

14. The method of claim 13 in which the above ground receiver is oriented substantially horizontally in the cradle.

15. The method of claim 12 further comprising:
detecting the orientation of the above-ground receiver; and
determining a location of the below-ground source based upon the detected magnetic field and the orientation of the above-ground receiver.

16. The method of claim 12 further comprising:
electronically connecting the rover to the above ground receiver.

17. A method, comprising:
planning a borepath;
determining a location of a plurality of waypoints along the borepath;
emitting a dipole magnetic field from a below-ground source;
placing an above-ground receiver into a cradle on a rover;
detecting the magnetic field with the above-ground receiver at a first above-ground location; and
moving the rover to a second above-ground location;
wherein the first above-ground location and the second above-ground location each correspond to a location at which a pre-determined field reading will exist when the below-ground source reaches a selected one of the plurality of waypoints; and
wherein the step of moving the rover to a second above-ground location comprises:
  detecting the pre-determined field reading at the first above-ground location; and
  moving the rover to the second above-ground location upon detecting the pre-determined field reading at the second above-ground location; and
  detecting the pre-determined field reading at the second above-ground location.

18. A method, comprising:
in a first mode corresponding to hand-held operation, detecting a magnetic field with a tracking device comprising an antenna array;
placing the tracking device on a wheeled rover;
electronically connecting the tracking device to the wheeled rover, thereby placing the tracking device into a second mode;
thereafter, detecting the magnetic field with the tracking device in the second mode; and
determining a location of a source of the magnetic field with the tracking device in a selected one of the first mode and the second mode.

19. The method of claim 18 in which the tracking device comprises an elongate body and the antenna array is disposed at an end of the elongate body, wherein the elongate body is substantially horizontal when placed on the wheeled rover.

20. The method of claim 18, wherein the antenna array is in a first orientation during hand-held operation and a second orientation when placed on a wheeled rover, the first orientation being substantially perpendicular to the second orientation.

21. The method of claim 20, further comprising:
while detecting the magnetic field in the second mode, moving the rover automatically within the magnetic field to a null location within the magnetic field.

* * * * *